US012671683B2

(12) United States Patent
Graefe

(10) Patent No.: US 12,671,683 B2
(45) Date of Patent: Jun. 30, 2026

(54) FINGERPRINTING PKI CERTIFICATES BI-DIRECTIONALLY

(71) Applicant: ARINC Incorporated, Annapolis, MD (US)

(72) Inventor: Jonathan M. Graefe, Annapolis, MD (US)

(73) Assignee: ARINC Incorporated, Annapolis, MD (US)

( * ) Notice: Subject to any disclaimer, the term of this patent is extended or adjusted under 35 U.S.C. 154(b) by 302 days.

(21) Appl. No.: 18/378,059

(22) Filed: Oct. 9, 2023

(65) Prior Publication Data

US 2025/0119419 A1 Apr. 10, 2025

(51) Int. Cl.
*H04L 9/40* (2022.01)

(52) U.S. Cl.
CPC ........ *H04L 63/0823* (2013.01); *H04L 63/166* (2013.01)

(58) Field of Classification Search
CPC . H04L 63/0823; H04L 63/166; H04L 9/3236; H04L 9/3263
See application file for complete search history.

(56) References Cited

U.S. PATENT DOCUMENTS

| | | | |
|---|---|---|---|
| 10,032,111 | B1 | 7/2018 | Bertram et al. |
| 10,382,562 | B2 * | 8/2019 | Yang ..................... H04L 9/3265 |
| 10,656,643 | B1 | 5/2020 | Bertram et al. |
| 10,935,938 | B1 | 3/2021 | Bertram et al. |
| 10,962,972 | B2 | 3/2021 | Koopman et al. |
| 11,042,673 | B1 | 6/2021 | McLean et al. |
| 11,107,001 | B1 | 8/2021 | Bertram et al. |
| 2020/0213206 | A1 * | 7/2020 | Bracken ................ H04L 43/026 |
| 2021/0067506 | A1 * | 3/2021 | Ideguchi ............. H04L 63/0823 |
| 2024/0333528 | A1 * | 10/2024 | Lewis ................... H04L 9/3268 |

FOREIGN PATENT DOCUMENTS

| | | | |
|---|---|---|---|
| CN | 115021932 A | 9/2022 | |
| EP | 3633949 B1 * | 9/2021 | ........... H04L 9/0819 |

(Continued)

OTHER PUBLICATIONS

RFC 6066—Transport Layer Security (TLS) Extensions— Extension Definitions; https://www.rfc-editor.org/rfc/pdfrfc/fc6066. txt.pdf; Jan. 1, 2011.

(Continued)

*Primary Examiner* — Mohammed Waliullah
(74) *Attorney, Agent, or Firm* — Suiter Swantz IP

(57) ABSTRACT

PKI Certificates are fingerprinted bi-directionally, replacing traditional certificate exchange in constrained computing and networking environments during a D/TLS session initiation for faster logon to well acquainted peers. Fingerprinting PKI Certificates bi-directionally allows for certificate compression when one or both peers are unacquainted and use of OCSP stapling or OCSP trusted responders offloading validation to robust clusters. A handshake is described for certificate exchange in an OCSP stapling or OSCP with trusted responder environment, and where the network and clients are constrained, which address the deficiencies of the RFC's.

19 Claims, 5 Drawing Sheets

(56)                    References Cited

FOREIGN PATENT DOCUMENTS

| | | | | | |
|---|---|---|---|---|---|
| JP | 2008079091 | A | * | 4/2008 | ......... H04L 63/0823 |
| JP | 2021039585 | A | * | 3/2021 | ......... H04L 67/5682 |

OTHER PUBLICATIONS

RFC 7250—Using Raw Public Keys in Transport Layer Security (TLS) and Datagram Transport Layer Security (DTLS); https://www.rfc-editor.org/rfc/pdfrfc/rfc7250.txt.pdf; published Jun. 1, 2014.

RFC 7924—Transport Layer Security (TLS) Cached Information Exchange; https://www.rfc-editor.org/rfc/pdfrfc/rfc7924.txt.pdf; published Jul. 1, 2016.

RFC 8446—The Transport Layer Security (TLS) Protocol Version 1.3; https://www.rfc-editor.org/rfc/pdfrfc/rfc8446.txt.pdf; published Aug. 1, 2018.

RFC 8879—TLS Certificate Compression; https://www.rfc-editor.org/rfc/rfc8879.pdf; Dec. 1, 2020.

RFC 9147—The Datagram Transport Layer Security (DTLS) Protocol Version 1.3; https://www.rf;c-editor.org/rfc/rfc9147.pdf; published Apr. 1, 2022.

Using trusted responders in constrained aviation environments to reduce authentication overhead; https://ieeexplore.ieee.org/abstract/document/10124308; published Apr. 18, 2023.

European Patent Office, Extended European Search Report received in EP Application No. 24205370.0, Dec. 5, 2024, 10 pages.

Ortiz-Yepes, "Optimizing TLS for Low Bandwidth Environments," Advances in Visual Computing, 16th International Symposium, ISVC 2021, Virtual Event, Proceedings, Part II, Apr. 5, 2015, 10 pages.

* cited by examiner

100

112

| 120 CLIENT CERT. | 121 CLIENT CERT. HASH |
|---|---|
| 122 SERVER CERT. | 123 SERVER CERT. HASH |
| 124 CERT. REQ. | 125 CERT. REQ. HASH |
| 126 SERVER CERT. COMPRESS. ALGORITHM | 127 SERVER CERT. COMPRESS. ALGORITHM REP. VALUE |
| 128 CLIENT CERT. COMPRESS. ALGORITHM | 129 CLIENT CERT. COMPRESS. ALGORITHM REP. VALUE |
| | 142 COMP. CLIENT CERT. |

| 130 CLIENT CERT. | 131 CLIENT CERT. HASH |

| 132 SERVER CERT. | 133 SERVER CERT. HASH |

| 134 CERT. REQ. | 135 CERT. REQ. HASH |

| 136 SERVER CERT. COMPRESS. ALGORITHM | 137 SERVER CERT. COMPRESS. ALGORITHM REP. VALUE |

| 138 CLIENT CERT. COMPRESS. ALGORITHM | 139 CLIENT CERT. COMPRESS. ALGORITHM REP. VALUE |

144 COMP. SERVER CERT.

FIG. 1C

FINGERPRINTING PKI CERTIFICATES BI-DIRECTIONALLY

TECHNICAL FIELD

The present invention generally relates to network security protocols, and more specifically to key distribution.

BACKGROUND

Vehicles use resource constrained computers and oftentimes work in limited Radio Frequency (RF) bandwidth environments sharing a single frequency between many vehicles. Maximizing the efficiency of transmission time is paramount to servicing communications needs of moving assets. There is a need to identify each asset with a unique identity certificate that can be verified. Standard methods of certificate path verification are very bandwidth and/or processor intensive and would present an undue burden on constrained computers and RF resources in the vehicle ecosystem. Therefore, it would be advantageous to provide a device, system, and method that cures the shortcomings described above.

SUMMARY

A method of performing a handshake is described. The method comprises transmitting, from a client to a server, a client hello; wherein the client hello comprises a client certificate hash, a server certificate hash, and a certificate request hash. The method comprises receiving, from the server to the client, a server hello in response to transmitting the client hello.

In some embodiments, the method is a handshake protocol for initiating at least one of a transport layer security session or a datagram transport layer security session.

In some embodiments, the client certificate hash, the server certificate hash, and the certificate request hash are transmitted using an extension status request.

In some embodiments, the method is backwards compatible with a datagram transport layer security version 1.3 handshake.

In some embodiments, the client certificate hash, the server certificate hash, and the certificate request hash are transmitted using a certificate status type enumeration.

In some embodiments, the client hello comprises a server certificate compression algorithm representative value and a client certificate compression algorithm representative value; wherein the server certificate compression algorithm representative value is a representative value of a server certificate compression algorithm; wherein the client certificate compression algorithm representative value is a representative value of a client certificate compression algorithm.

In some embodiments, the server certificate compression algorithm and the client certificate compression algorithm are a same algorithm.

In some embodiments, at least one of the server certificate compression algorithm or the client certificate compression algorithm comprises zlib, brotli, or zstd.

In some embodiments, the server hello comprises a client certificate confirmation. In some embodiments, the server hello comprises a server certificate confirmation.

In some embodiments, the server hello comprises a server certificate.

In some embodiments, the client hello comprises a server certificate compression algorithm representative value; wherein the server certificate compression algorithm representative value is a representative value of a server certificate compression algorithm; wherein the server hello comprises a compressed server certificate; wherein the server compresses a server certificate to the compressed server certificate using the server certificate compression algorithm.

In some embodiments, the server hello comprises one or more Online Certificate Status Protocol extensions.

In some embodiments, the server hello comprises a client certificate request; the method further comprising transmitting, from the client to the server, a client certificate response in response to receiving the server hello.

In some embodiments, the client certificate response comprises the client certificate. In some embodiments, the client hello comprises a client certificate compression algorithm representative value; wherein the client certificate compression algorithm representative value is a representative value of a client certificate compression algorithm; wherein the client certificate response comprises a compressed client certificate; wherein the client compresses a client certificate to the compressed client certificate using the client certificate compression algorithm.

In some embodiments, the method comprises receiving, from the server to the client, a hello retry request in response to transmitting the client hello. The hello retry request comprises a cookie. The method comprises transmitting, from the client to the server, the client hello and the cookie in response to receiving the hello retry request. The server hello is received in response to transmitting the client hello and the cookie.

A client is described. The client comprises a memory maintaining program instructions. The client comprises one or more processors configured to execute the program instructions causing the one or more processors to perform a handshake with a server. The handshake comprises transmitting, from the client to the server, a client hello; wherein the client hello comprises a client certificate hash, a server certificate hash, and a certificate request hash. The handshake comprises receiving, from the server to the client, a server hello in response to transmitting the client hello.

A system is described, in accordance with one or more embodiments of the present disclosure. The system comprises a server. The system comprises a client. The client comprises a memory maintaining program instructions. The client comprises one or more processors configured to execute the program instructions causing the one or more processors to perform a handshake with the server. The handshake comprises transmitting, from the client to the server, a client hello; wherein the client hello comprises a client certificate hash, a server certificate hash, and a certificate request hash. The handshake comprises receiving, from the server to the client, a server hello in response to transmitting the client hello.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 1B-1C depict a simplified block diagram of a memory, in accordance with one or more embodiments of the present disclosure.

DETAILED DESCRIPTION OF THE INVENTION

Figure 1A:
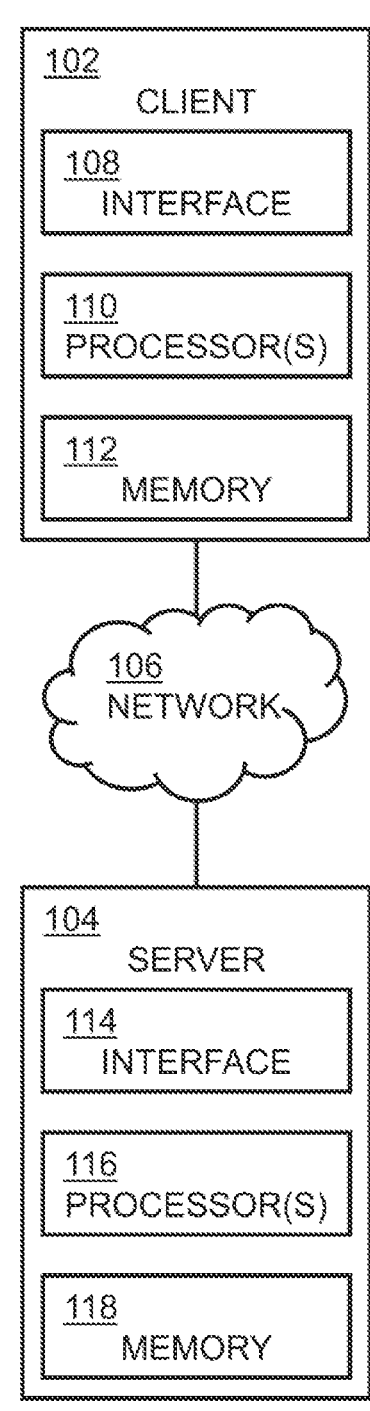
FIG. 1A depicts a simplified block diagram of a system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

LIST OF TERMS

Air navigation service provider (ANSP)
Air Operator Certificate (AOC)

Certificate Authority (CA)
Distinguished Encoding Rules (DER)
Datagram Transport Layer Security (DTLS)
Elliptic Curve Digital Signature Algorithm (ECDSA)
Internet Assigned Numbers Authority (IANA)
Internet Protocol Suite (IPS)
Online Certificate Status Protocol (OSCP)
Public Key Infrastructure (PKI)
Radio Frequency (RF)
Rivest-Shamir-Adleman (RSA)
Server-based Certificate Validation Protocol (SCVP)
Transport Layer Security (TLS)
VHF Data Link (VDL)
Very High Frequency (VHF)

TLS and DTLS are methods of securing a connection between two endpoints: a client and a server. During a TLS or DTLS logon, when identity certificates are exchanged, the server and client must exchange full or raw certificates. The full certificates may be exchanged according to RFC 8446 TLS 1.3. The handshake process can take some time, especially as the length of the certificates increase. Reducing the length of the certificates reduces the overhead of the handshakes, making the handshakes faster. The certificates are exchanged in the clear and then piped through a mathematical equation called Diffie Hellman. Diffie Hellman generates a session key based on the certificates and other computational inputs.

When operating in constrained networking environments, bandwidth is limited. Both full and raw certificates present a challenge to expedient logins. Certificates cross signed by multiple CAs and sub-CAs can expand in size correlated to the depth of the PKI infrastructure and number of cross signers. For instance, ECDSA Certificates with a root CA, a sub-CA and a Bridge CA can approach 2 Kilo Bytes or more in size. RSA certificates are significantly larger. Several RFCs have been proposed to reduce the bandwidth when exchanging certificates.

RFC 7924, titled "Cached information Extension", allows the client to send to the server a fingerprint hash of the server certificate which the client has previously cached. If the server is using short lived certificates, then the hashing function defined in RFC 7924 is near unusable as certificate renewals will necessarily change the validity dates of the server certificate making any previous hash invalid. This function is challenging when the server certificate of the server is a short-lived certificate, which are rapidly becoming a standard in web servers and in the aviation market. RFC 7924 also lacks a function to allow the client to identify the client certificate using a hashed function or do a mixed mode of different functions. RFC 7924 lacks the ability for any type of online validation using SCVP or OSCP in TLS 1.3 with the results returned to the constrained computer. If the client's certificate is long lived, RFC 7924 does not provide a single direction hash at the same time as using a different method for the server's certificate. RFC 7924 also suffers from a lack of extensions allowing for an OCSP stapling or OCSP trusted responder to be used during the verification process.

RFC 8879 titled "TLS Compression" suffers from similar issues as RFC 7924. RFC 8879 lacks the ability to engage an OCSP stapling function according to RFC 6066 during a D/TLS certificate exchange according to RFC 8446 (TLS 1.3). RFC 8879 also lacks the ability to indicate if a certificate is compressed, not compressed, or reduced in another way. Once a server has decided to engage compression the entire exchange must be compressed. RFC 8879 allows for the use of compressed certificates by allowing the client and server to agree on a compression algorithm, which both must use for their certificate exchange. RFC 8879 does not work when short lived certificates are used by one or both endpoints. In addition, RFC 8879 does not allow for extensions to be transmitted with the compressed certificate, such as the OCSP Certificate status message according to RFC 6066, which is critical in a OCSP with trusted responder environment and offloads certificate verification to robust servers. The RFC 8879 also lacks flags for non-symmetric compression or using multiple methods of encoding of certificates.

Reference will now be made in detail to the subject matter disclosed, which is illustrated in the accompanying drawings. Embodiments of the present disclosure are generally directed to fingerprinting PKI Certificates bi-directionally, replacing traditional certificate exchange in constrained computing and networking environments during a D/TLS session initiation for faster logon to well acquainted peers. Fingerprinting PKI Certificates bi-directionally allows for certificate compression when one or both peers are unacquainted and enable the use of OCSP stapling or OCSP trusted responders offloading validation to robust clusters. A handshake is described for certificate exchange in an OCSP stapling or OSCP with trusted responder environment, and where the network and clients are constrained, which address the deficiencies of the RFC's.

When identity certificates are exchanged at first use, during a D/TLS logon, the server 104 and client 102 each cache the received certificates and exchange fingerprints at subsequent logins. Fingerprints of the certificate and additional information are used as an index on the server and client to retrieve the certificates. The fingerprints reduce radio and login time. In some embodiments, when certificates are first exchanged, compressed certificates may be used. The OCSP stapling service can also be engaged to alleviate the constrained computer's need to verify the certificate chain. Only the signature of the OCSP message needs to be verified by the client, reducing computational time on the constrained computer, moving the certificate path verification to OCSP servers or trusted responders. Mixed-mode compression may be performed where one certificate can be compressed while the other is fingerprinted.

Referring now to FIGS. 1A-1C, a system 100 is described, in accordance with one or more embodiments of the present disclosure. The system 100 includes one or more components, such as, but not limited to, a client 102, server 104, network 106, and the like.

The system 100 includes the client 102. The client 102 is an endpoint which initiates a connection. In some embodiments, the client 102 is a moving constrained computer. For example, the client 102 may be a vehicle, such as an aircraft. In some embodiments, the client 102 is an IPS gateway, ANSP, AOC operator, or the like. For example, the client 102 may be an IPS gateway at layer 2. The client 102 includes one or more components, such as, but not limited to, a communication interface 108, one or more processors 110, memory 112, and the like.

The system 100 includes the server 104. The server 104 is an endpoint to which the client 102 initiates a connection. The server 104 may be a ground-based server, a stationary computer, or the like. The server 104 may include significantly more processing power than the client 102. The server 104 includes one or more components, such as, but not limited to, a communication interface 114, one or more processors 116, memory 118, and the like.

The one or more processors (e.g., processors 110, processors 116) may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). In one embodiment, the one or more processors may be embodied as a desktop computer, mainframe computer system, workstation, image computer, parallel processor, networked computer, or any other computer system configured to execute a program instruction, as described throughout the present disclosure.

The memory (e.g., memory 112, memory 118) may include any storage medium known in the art suitable for storing program instructions executable by the associated one or more processors. For example, the memory may include a non-transitory memory medium. By way of another example, the memory may include, but is not limited to, a read-only memory (ROM), a random-access memory (RAM), a magnetic or optical memory device (e.g., disk), a magnetic tape, a solid-state drive and the like. It is further noted that memory may be housed in a common controller housing with the one or more processors. In one embodiment, the memory may be located remotely with respect to the physical location of the one or more processors. For instance, the one or more processors may access a remote memory (e.g., server), accessible through a network (e.g., internet, intranet and the like).

The system 100 includes the network 106. In some embodiments, the network 106 is an IPS network. One of the large contributors to transmission time in an IPS network is the login process.

In some embodiments, the network 106 may include a radio frequency (RF) network. The network 106 may include a bandwidth which is constrained. The network 106 may be a constrained RF network used for cellular and/or aviation communications. Vehicles, such as aircraft, oftentimes work in limited RF bandwidth environments sharing a single frequency between many vehicles. In some embodiments, the network 106 is a VDL service, cellular network, satellite network, or the like. The network 106 has a very limited frame size in aircraft-to-ground communication. The network 106 may use small frame sizes to ensure the most equitable use of the RF space. For example, if the frame size is 156 bits, such as in the cellular market, then a full certificate exchange would require 212 individual frames. Therefore, it is desirable to limit the amount of RF bandwidth required to transmit certificates back and forth between the client 102 and server 104.

The client 102 and server 104 communicate via network 106. For example, the client 102 may transmit various messages to the server 104 and receive various messages from the server 104 via the network 106. The client 102 may transmit the messages to the server 104 and receive various messages from the server 104 via the network 106. For example, the messages may include a client hello, hello retry request, server hello, certificate, acknowledgement, application data, and the like.

The client 102 and server 104 may communicate via the network 106 by way of the communication interface 108 and the communication interface, respectively. The communication interface (e.g., communication interface 108, communication interface 114) may include one or more antennas configured to communicate via RF link. The communication interface may communicate via an air-to-ground communication channel. Various messages may be transmitted over the air-to-ground communication channel.

In some embodiments, the client 102 and the server 104 establish a connection. The connection may also be referred to as an association. The client 102 and server 104 may establish the connection using a communications protocol, such as, but not limited to, Transport Layer Security (TLS), Datagram TLS (DTLS), and the like. The client 102 and server 104 may use any suitable communication protocol such as, but not limited to, any version of TLS (e.g., TLS 1.3), any version of DTLS (e.g., DTLS 1.3), or the like.

The client 102 and the server 104 establish the connection via a handshake. The handshake is a negotiation between the client 102 and the server 104 to establish one or more parameters of the connection. The handshake may follow one or more methods, as will be described further herein. The handshake may include exchanging various certificates. The certificates may also be referred to as a public key certificate, public key infrastructure (PKI) certificate, digital certificate, identity certificate, or the like. The certificates may include ECDSA certificates, RSA certificates, or the like. Exchanging the certificates via RF link may result in delayed logins, especially if the latency is variable such as in moving vehicles.

The certificates are exchanged to establish a session key. The session key is the actual encryption used for the session. Prior to establishing the session key, the information exchanged between the client 102 and the server 104 is unencrypted.

The client 102 includes the memory 112. The memory 112 may include a client certificate 120, server certificate 122, certificate request 124, server certificate compression algorithm 126, client certificate compression algorithm 128, and the like.

The client certificate 120 may also be referred to as a current client certificate, a vehicle certificate, an aircraft certificate, or the like. The client certificate 120 may be a long-lived certificate. Long-lived certificates refer to certificates which are valid for weeks or months. The long-lived certificates may be valid for up to 1095 days or less, depending on various inputs.

The server certificate 122 may also be referred to as a previously recorded server certificate. For example, the server certificate 122 is previously recorded from the server certificate 132 during an initial TLS/DTLS logon. The terms logons, logins, and connection establishments may be used interchangeably. The server certificate 122 may or may not be valid for a current handshake.

The certificate request 124 may include OCSP with trusted responder extensions.

The server certificate compression algorithm 126 may be used to decompress the server certificate 132 received from the server 104.

The client certificate compression algorithm 128 may be used to compress the client certificate 120 prior to transmitting to the server 104.

The server 104 includes the memory 118. The memory 118 may include a client certificate 130, server certificate 132, certificate request 134, server certificate compression algorithm 136, client certificate compression algorithm 138, and the like.

The client certificate 130 may also be referred to as a previously recorded client certificate. For example, the client certificate 130 is previously recorded from the client certificate 120 during an initial TLS/DTLS logon. The client certificate 130 may or may not be valid for a current handshake.

The server certificate 132 may also be referred to as a current server certificate, a ground station certificate, or the like. The server certificate 132 may be a short-lived certificate. Short-lived certificates refer to certificates which are valid for 24 to 72 hours.

The certificate request 134 may include OCSP with trusted responder extensions.

The server certificate compression algorithm 136 may be used to compress the server certificate 132 prior to transmitting to the client 102.

The client certificate compression algorithm 138 may be used to decompress the client certificate 120 received from client 102.

The server certificate compression algorithm 126, the client certificate compression algorithm 128, the server certificate compression algorithm 136, and the client certificate compression algorithm 138 may be collectively referred to as compression algorithms. The compression algorithms may include any suitable compression algorithms. For example, the compression algorithms may include, but are not limited to, zlib, brotli, zstd.

The server certificate compression algorithm representative value 127, the client certificate compression algorithm representative value 129, the server certificate compression algorithm representative value 137, and the client certificate compression algorithm representative value 139 may be collectively referred to as compression algorithm representative values. There is no need to exchange the actual compression algorithms between the client 102 and the server 104. Instead, representative values of the compression algorithms are exchanged. The compression algorithms may be negotiated between the client 102 and the server 104 using the compression algorithm representative values. In some embodiments, the compression algorithm representative values may be like a certificate compression algorithm enumeration from RFC 8879 Section 3. The compression algorithm representative values indicates to the server 104 that the client 102 may receive compressed certificates using a compression algorithm associated with and/or represented by the compression algorithm representative values.

In some embodiments, the compression algorithm representative values are numerical integers.

The server certificate compression algorithm 126 and the server certificate compression algorithm 136 are a same algorithm.

The client certificate compression algorithm 128 and the client certificate compression algorithm 138 are a same algorithm.

In some embodiments, each of the compression algorithms are a same algorithm. It is further contemplated that the server certificate compression algorithm 126 and the server certificate compression algorithm 136 may be a first compression algorithm, and the client certificate compression algorithm 128 and the client certificate compression algorithm 138 may be a second compression algorithm, where the first algorithm and the second algorithm are different.

The client 102 may define one or more cached information types. The cached information types may be maintained in memory 112. The cached information types may include a client certificate hash 121, server certificate hash 123, certificate request hash 125, server certificate compression algorithm representative value 127, client certificate compression algorithm representative value 129, and the like.

The client certificate hash 121, server certificate hash 123, certificate request hash 125, server certificate compression algorithm representative value 127, client certificate compression algorithm representative value 129 are hashes of the client certificate 120, server certificate 122, certificate request 124, server certificate compression algorithm 126, and client certificate compression algorithm 128, respectively.

The client certificate hash 121 is a hash of the client certificate 120. The client certificate hash 121 may be used as an index to retrieve the client certificate 120.

The server certificate hash 123 is a hash of the server certificate 122. The server certificate hash 123 may be used as an index to retrieve the server certificate 122.

The certificate request hash 125 is a hash of the certificate request 124. The certificate request hash 125 may be a fingerprint for an object of type 'cert_req' or a cert_req including extensions such as a certificate status request according to RFC 6066. The certificate status request may also include OSCP status request messaging.

The server certificate compression algorithm representative value 127 is a representative value of the server certificate compression algorithm 126. The server certificate compression algorithm representative value 127 may indicate the availability to exchange compressed server certificates and the server certificate compression algorithm 126 used for such compressing and decompressing the compressed server certificates.

The client certificate compression algorithm representative value 129 is a representative value of the client certificate compression algorithm 128. The client certificate compression algorithm representative value 129 may indicate the availability to exchange compressed client certificates and the client certificate compression algorithm 128 used for such compressing and decompressing the compressed client certificates.

The server 104 may define one or more cached information types. The cached information types may be maintained in memory 118. The cached information types may include a client certificate hash 131, server certificate hash 133, certificate request hash 135, server certificate compression algorithm representative value 137, client certificate compression algorithm representative value 139, and the like.

The client certificate hash 131, server certificate hash 133, certificate request hash 135, server certificate compression algorithm representative value 137, client certificate compression algorithm representative value 139 are hashes of the client certificate 130, server certificate 132, certificate request 134, server certificate compression algorithm 136, and client certificate compression algorithm 138, respectively.

The client certificate hash 131 is a hash of the client certificate 130. The client certificate hash 131 may be used as an index to retrieve the client certificate 130.

The server certificate hash 133 is a hash of the server certificate 132. The server certificate hash 133 may be used as an index to retrieve the server certificate 132.

The certificate request hash 135 is a hash of the certificate request 134. The certificate request hash 135 may be a fingerprint for an object of type 'cert_req' or a cert_req including extensions such as a certificate status request according to RFC 6066. The certificate status request may also include OSCP status request messaging.

The server certificate compression algorithm representative value 137 is a representative value of the server certificate compression algorithm 136. The server certificate compression algorithm representative value 137 may indicate the availability to exchange compressed server certificates and the server certificate compression algorithm 136 used for such compressing and decompressing the compressed server certificates.

The client certificate compression algorithm representative value 139 is a representative value of the client certificate compression algorithm 138. The client certificate compression algorithm representative value 139 may indicate the availability to exchange compressed client certificates and the client certificate compression algorithm 138 used for such compressing and decompressing the compressed client certificates.

The client certificate hash 121, server certificate hash 123, certificate request hash 125, server certificate compression algorithm representative value 127, client certificate compression algorithm representative value 129, client certificate hash 131, server certificate hash 133, certificate request hash 135, server certificate compression algorithm representative value 137, and/or client certificate compression algorithm representative value 139 may be collectively referred to as the hashes. The hashes may also be referred to as fingerprints, fingerprint hashes, and the like.

In some embodiments, the hashes may include a size. For example, the hashes may be a 256-bit hash.

During an initial TLS/DTLS logon, the client 102 and server 104 exchange the client certificate 120 and the server certificate 132. The client 102 caches the server certificate 132 in memory 112 as the server certificate 122. The server 104 caches the client certificate 120 in memory 118 as the client certificate 130. In some embodiments, the server 104 and client 102 exchange full certificates. For example, the server 104 and client 102 exchange certificates according to RFC 8446 TLS 1.3. In some embodiments, the server 104 and client 102 exchange compressed certificates. Once the client certificate and the server certificate have been exchanged, the client and server caches the certificates in memory. Hashes of the certificates may then be used as an index to retrieve the certificates.

During a subsequent TLS/DTLS logon, the client 102 transmits the client certificate hash 121, server certificate hash 123, certificate request hash 125, server certificate compression algorithm representative value 127, and/or the client certificate compression algorithm representative value 129 to the server 104. The server 104 uses the client certificate hash 121 to retrieve the client certificate 130 from memory 118. The client certificate hash 121 is likely to match the client certificate hash 131, because the client certificate 120 is long-lived. The server 104 uses the server certificate hash 123 to retrieve the server certificate 132 from memory 118. The server certificate hash 123 may or may not match the server certificate hash 133, because the server certificate 132 is short-lived. The server 104 may then check that each of the client certificate 130 and the server certificate 132 are valid. Thus, the client certificate 120 and the server certificate 122 do not need to be exchanged during the subsequent logon. The server 104 and client 102 cache the certificates and hashes at subsequent logins showing possession using much smaller indexes into a database. Transmitting the client certificate hash 121 and the server certificate hash 123 requires a reduced packet size, as compared to the transmitting the client certificate 120 and the server certificate 132.

In some embodiments, the client 102 may include one or more compressed data types maintained in memory 112. In some embodiments, the memory 112 includes a compressed client certificate 142. The compressed client certificate 142 is compressed from the client certificate 120. The client 102 compresses the client certificate 120 to the compressed client certificate 142 using the client certificate compression algorithm 128. The client 102 may transmit the compressed client certificate 142 to the server 104. The compressed client certificate 142 may be transmitted when there is a hash miss between the client certificate hash 121 and the client certificate hash 131. The server 104 may decompress the compressed client certificate 142 using the client certificate compression algorithm 138. The server 104 decompresses the compressed client certificate 142 to determine and/or update the client certificate 130.

In some embodiments, the server 104 may include one or more compressed data types maintained in memory 118. In some embodiments, the memory 112 includes a compressed server certificate 144. The compressed client certificate 144 is compressed from the server certificate 132. The server 104 compresses the server certificate 132 to the compressed server certificate 144 using the server certificate compression algorithm 126. The server 104 may transmit the compressed server certificate 144 to the client 102. The compressed server certificate 144 may be transmitted when there is a hash miss between the server certificate hash 123 and the server certificate hash 133. The client 102 may decompress the compressed server certificate 144 using the server certificate compression algorithm 126. The client 102 decompresses the compressed server certificate 144 to determine and/or update the server certificate 120.

Figure 2:
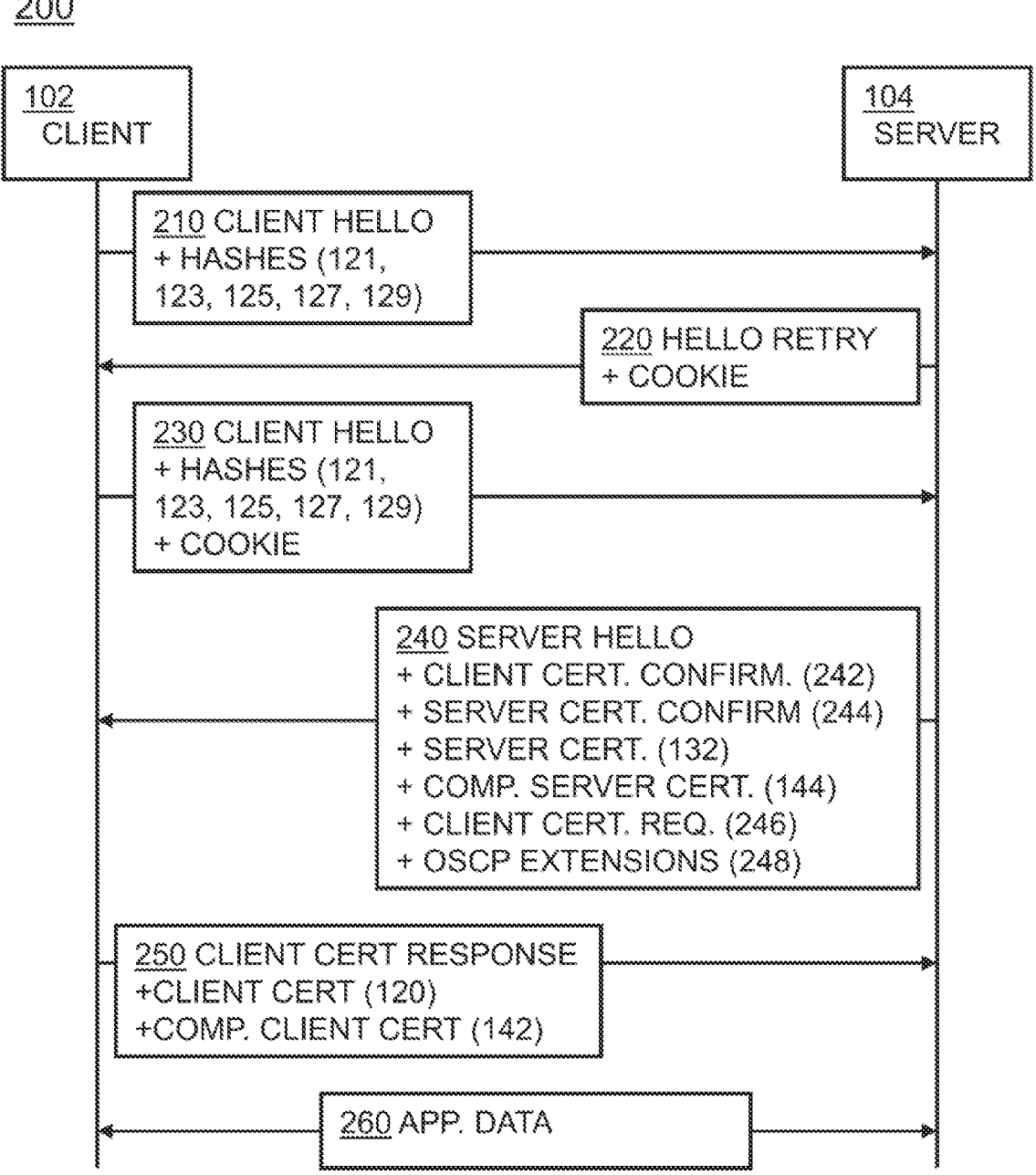
FIG. 2 depicts a flow diagram of a method, in accordance with one or more embodiments of the present disclosure.

Referring now to FIG. 2, a method 200 is described, in accordance with one or more embodiments of the present disclosure. Each of the steps of transmitting messages may also be referred to as flights, message flights, or the like. The method provides for fast certificate exchange which saves transmission time over the network 106. The embodiments and the enabling technology described previously herein in the context of the system 100 should be interpreted to extend to the method. For example, the embodiments and enabling technology of the method should be interpreted to be implemented by the processors of the client 102 and/or server 104. It is further recognized, however, that the method is not limited to the system 100.

In a step 210, a client hello is transmitted, from the client 102 to the server 104. The client hello includes one or more of the client certificate hash 121, server certificate hash 123, certificate request hash 125, server certificate compression algorithm representative value 127, and/or client certificate compression algorithm representative value 129.

The client certificate hash 121, server certificate hash 123, certificate request hash 125, server certificate compression algorithm representative value 127, and/or client certificate compression algorithm representative value 129 may be transmitted in any portion of the hello message. For example, the client certificate hash 121, server certificate hash 123, certificate request hash 125, server certificate compression algorithm representative value 127, and/or client certificate compression algorithm representative value 129 may be transmitted in a client hello extension status request, in a certificate status type enumeration, and the like.

In some embodiments, the client certificate hash 121, server certificate hash 123, certificate request hash 125, server certificate compression algorithm representative value 127, and/or client certificate compression algorithm representative value 129 are transmitted using a cached information extension. The cached info extension is defined according to RFC 7924 titled "Cached information Extension". For example, the client hello may include an extension status request. The extension status request may include the client certificate hash 121, server certificate hash 123, certificate request hash 125, server certificate compression algorithm representative value 127, and/or client certificate compression algorithm representative value 129. New cached information types are added following the policy described in RFC 7924 section 8. The cached information may be added to the TLS Cached Information Type Values in the registry between 224 and 255. For example, the cached information is transmitted in a manner which is compliant with RFC 8446 TLS 1.3 and RFC 9147 DTLS 1.3 requirements. The cached information does not break DTLS or TLS because the client hello is extended from RFC 7924. Not breaking DTLS or TLS is desirable to ensure backwards compliance with legacy systems. Cached information types extend the existing RFC7924 functionality to allow for client fingerprints and include TLS extensions from RFC8446 and selected RFC8879 functionality, such as using RFC6066 Status Messages to engage an OCSP trusted responder during a cached_info exchange of the server's certificate.

Although the client certificate hash 121, server certificate hash 123, certificate request hash 125, server certificate compression algorithm representative value 127, and/or client certificate compression algorithm representative value 129 have been described as transmitted using a cached info extension defined according to RFC 7924, this is not intended as a limitation of the present disclosure.

In some embodiments, the hello message may include a status request. The status request may be in accordance with RFC 6066 section 8. The status request includes an extensions data field with a certificate status request. The certificate status request may include a certificate status type enumeration. The certificate status type enumeration may include the client certificate hash 121, server certificate hash 123, certificate request hash 125, server certificate compression algorithm representative value 127, and/or client certificate compression algorithm representative value 129. Transmitting the client certificate hash 121, server certificate hash 123, certificate request hash 125, server certificate compression algorithm representative value 127, and/or client certificate compression algorithm representative value 129 in the certificate status type enumeration is not backwards compatible with TLS/DTLS 1.3 without coordination with IETF to extend the certificate status type enumeration to include the various hashes via a subsequent RFC. Thus, the client certificate hash 121, server certificate hash 123, certificate request hash 125, server certificate compression algorithm representative value 127, and/or client certificate compression algorithm representative value 129 may be transmitted in a manner which is not compatible with TLS/DTLS 1.3. The encoding scheme is compatible with TLS and DTLS making this encoding scheme non-conflicting with all existing implementations of TLS and DTLS, including those which do not implement exchanging the hashes.

Transmitting the client certificate hash 121, server certificate hash 123, certificate request hash 125, server certificate compression algorithm representative value 127, and/or client certificate compression algorithm representative value 129 via the network 106 requires significantly less overhead than transmitting the client certificate 120, server certificate 122, certificate request 124, server certificate compression algorithm 126, and/or client certificate compression algorithm 128 via the network 106. In this regard, the RF bandwidth required to transmit certificates is reduced bidirectionally.

In a step 220, a hello retry request may be received, from the server 104 to the client 102. The hello retry request includes a cookie. The cookie may include a data type, such as, but not limited to, opaque. The hello retry request may be received in response to transmitting the client hello.

In a step 230, the client hello and the cookie may be transmitted, from the client 102 to the server 104. The client hello and the cookie may be transmitted in response to receiving the hello retry request.

In some embodiments, the steps 220 and 230 may be considered an optional step. The hello retry request and the client hello with the cookie may be considered a cookie exchange between the client 102 and the server 104.

In a step 240, a server hello is received, from the server 104 to the client 102. The server hello is received in response to transmitting the client hello. In some embodiments, the server hello is received in response to transmitting the client hello and the cookie. When the client hello, and optionally the cookie, are received by the server 104, the server 104 can verify that the cookie is valid, if present. The server 104 determines which services the server 104 should engage depending if the hashes received from the client 102 matches the hashes maintained in memory 118 of the server 104 and/or if the hashes received indexes to the certificates maintained in memory 118. For example, the server 104 compares the client certificate hash 131 and the client certificate hash 121 and/or determines if the client certificate hash 121 indexes to the client certificate 130. By way of another example, the server 104 compares the server certificate hash 133 and the server certificate hash 123 and/or determines if the server certificate hash 123 indexes to the server certificate 132.

In some embodiments, the server hello includes a client certificate confirmation 242. The server 104 indexes the client certificate hash 121 with the client certificate hash 131. If the client certificate hash 121 matches the client certificate hash 131, the server 104 finds the client certificate 130. The matching may also be referred to as a hash hit. The client 102 and the server 104 then include matching client certificates (i.e., the client certificate 120 matches the client certificate 130). The server hello includes the client certificate confirmation 242 if the client certificate 120 matches the client certificate 130.

In some embodiments, the server hello includes a server certificate confirmation 244. The server 104 indexes the server certificate hash 123 with the server certificate hash 133. If the server certificate hash 123 matches the server certificate hash 133, the server 104 finds the server certificate 132. The client 102 and the server 104 then include matching server certificates (i.e., the server certificate 122 matches the server certificate 132). The server hello includes the server certificate confirmation 244 if the server certificate 122 matches the server certificate 132.

In some embodiments, the server hello includes an indication whether the server supports receiving the client certificate hash 121 and/or an indication whether the server supports receiving the server certificate hash 123. The indications are not depicted.

If the client 102 and the server 104 include both matching client certificates and server certificates, then the server hello includes both the client certificate confirmation 242 and the server certificate confirmation 244. The client 102 and the server 104 do not need to further exchange certificates if the server hello includes both the client certificate confirmation 242 and the server certificate confirmation 244. Thus, the existing certificate exchange methods provided in TLS/ DTLS after the server hello are superfluous. The handshake may be established by complete fingerprinting if the client 102 and the server 104 include both matching client certificates and server certificates.

In some embodiments, the server hello includes the server certificate 132. The server 104 indexes the server certificate hash 123 with the server certificate hash 133. If the server certificate hash 123 does not match the server certificate hash 133, the server 104 does not find the server certificate 132. The failure to find may also be referred to as a hash miss. The client 102 and the server 104 do not include matching server certificates (i.e., the server certificate 122 does not match the server certificate 132). The server hello includes the server certificate 132 if the server certificate 122 does not match the server certificate 132. Including the server certificate 132 in the server hello may significantly increase the number of bits of the server hello message. In response to receiving the server certificate 132, the client 102 updates the server certificate 122 and the server certificate hash 123 with the server certificate 132 and the server certificate hash 133, respectively.

In some embodiments, the server hello includes the compressed server certificate 144. The server 104 compresses the server certificate 132 using the server certificate compression algorithm 136 to generate the compressed server certificate 144. The client 102 determines the server certificate 122 from the compressed server certificate 144. The client 102 may decompress the compressed server certificate in the server hello using to the server certificate compression algorithm to determine the server certificate 122. In this regard, when the server certificate hash 123 fails, the server 104 may cause the client to update the server certificate 122 and the server certificate hash 123, while using reduced bandwidth. For example, a size of the compressed server certificate 144 is less than a size of the server certificate 132.

In some embodiments, the server hello includes a client certificate request 246. The client certificate request 246 is a request from the server 104 to the client 102 for the client certificate 120. The server 104 indexes the client certificate hash 121 with the client certificate hash 131. If the client certificate hash 121 does not match the client certificate hash 131, then the server 104 does not include the client certificate 120. The client 102 and the server 104 then do not include matching client certificates (i.e., the client certificate 120 does not match the client certificate 130). The server hello includes the client certificate request 246 if the client certificate 120 does not match the client certificate 130.

It is contemplated that the server hello will most commonly include the client certificate confirmation 242 and the server certificate 132. For example, the client certificate 120 is long-lived and the server certificate 132 is short-lived, such that the client 102 and server 104 are more likely to match the client certificate 120 and the client certificate 130 and less likely to match the server certificate 122 and the server certificate 132. The server noticing a match on the client certificate 120 but not the server certificate 132 uses the client certificate confirmation 242 to acknowledge the client certificate 120 and uses compression when transmitting the server certificate 132. The server hello including the client certificate confirmation 242 and the server certificate 132 may be considered a mixed mode of hashing and compression. Mixed modes of hashing, compression, and uncompressed certificate exchange may be used while preserving the ability to use OCSP stapling and OCSP with trusted responder or any other TLS extension in the client certificate request 246 and certificate exchange. This mixed mode technique will reduce login times and on frequency time, as compared to the transmitting the client certificate 120 after receiving the server hello.

In some embodiments, the server hello may include OSCP extensions 248. In some embodiments, the certificates are verified using OSCP. Certificate verification using OCSP is faster than onboard certificate verification. The OSCP extensions 248 may include OCSP with trusted responder extensions. For example, the OSCP with trusted responder extensions may include an OSCP Status request and/or OSCP Response. The OSCP extensions 248 allow a response to return to the client 102. The OCSP Response may be configured according to RFC 6066. The OSCP response may be a complete, DER-encoded OCSP response. The OSCP response comes back with (1) either certificate is good, revoked, or unknown; (2) which server authenticated that certificate; (3) signing key of the server that certified the certificate; and (4) produced at time.

In some embodiments, the OSCP extensions 248 are extensions of the compressed server certificate 144.

In an optional step 250, a client certificate response is transmitted, from the client 102 to the server 104. The client certificate response is transmitted in response to receiving the client certificate request 246.

In some embodiments, the client certificate response includes the client certificate 120.

In some embodiments, client certificate response includes the compressed client certificate 142. The client 102 compresses the client certificate 120 according to the client certificate compression algorithm 126 to generate the compressed client certificate 142. The server 104 determines the client certificate 130 from the compressed client certificate 142. The server 104 may decompress the compressed client certificate 142 in the client certificate response using to the client certificate compression algorithm to determine the client certificate 130. In this regard, when the client certificate hash 121 fails, the client 102 may cause the server 104 to update the client certificate 130 and the client certificate hash 131, while using reduced bandwidth. For example, a size of the compressed client certificate 142 is less than a size of the client certificate 120.

In a step 260, application data is transmitted and received between the client 102 and the server 104. The application data is encrypted using a session key based on the client certificate and the server certificate.

The certificate exchange time is cut significantly when using the method, as compared to existing D/TLS handshake protocols. The method 200 may be considered a best-case scenario, where the server 104 has both the client certificate hash 121 and the server certificate hash 123 maintained in memory 118. In this regard, the client 102 has the current server certificate in memory 112 and the server 104 has the current client certificate in memory 118. It is contemplated that the method 200 may achieve a significant improvement in certificate exchange time over existing DTLS 1.3 handshakes.

Figure 3:
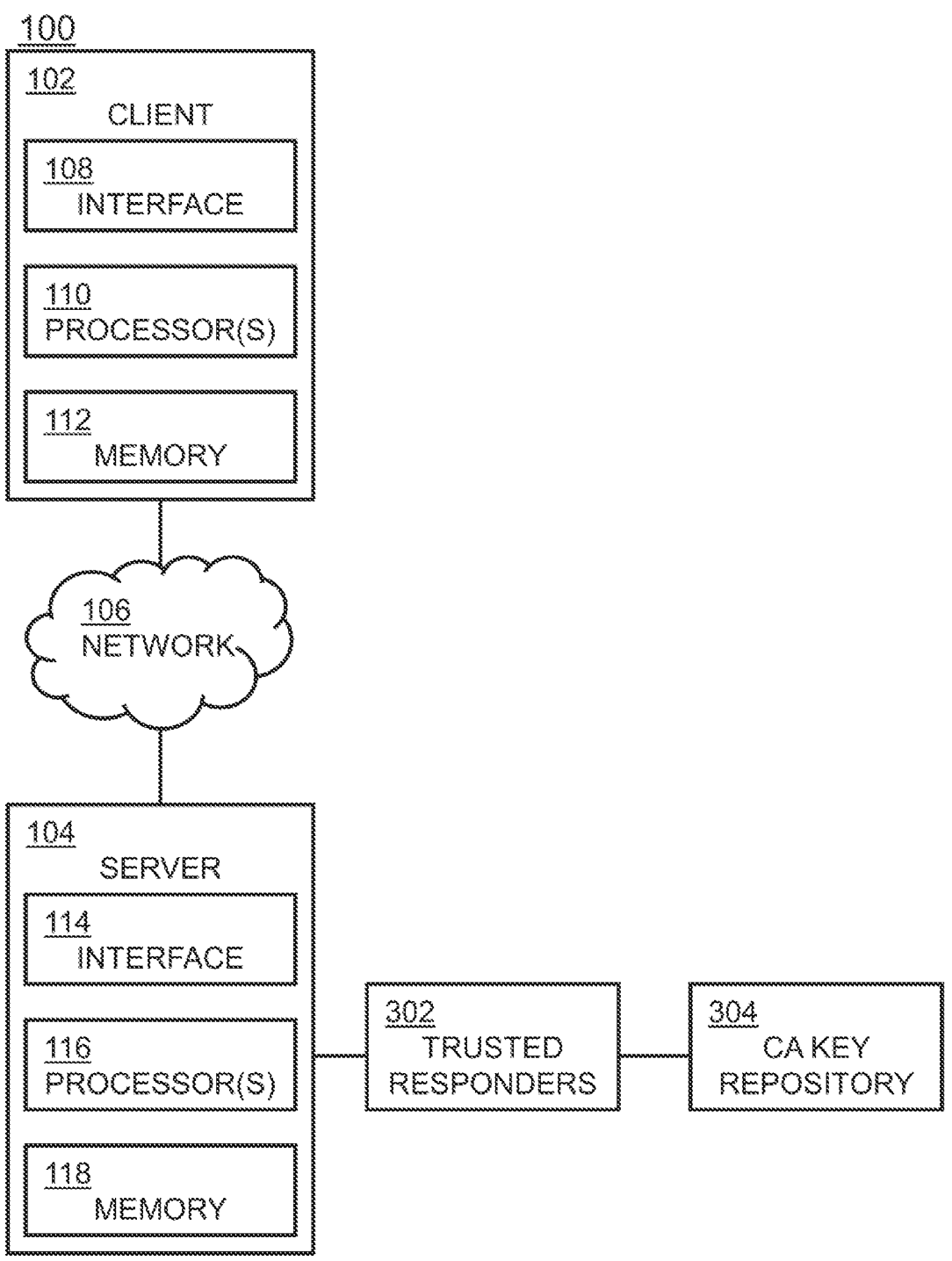
FIG. 3 depicts a simplified block diagram of a system, in accordance with one or more embodiments of the present disclosure.

Referring now to FIG. 3, the system 100 is described, in accordance with one or more embodiments of the present disclosure.

Short-lived certificates requires verification on the intermediate and root certificates along the PKI chain. In some embodiments, the system 100 may verify the certificates. The system 100 may verify the certificates using any suitable process, such as, but not limited to, OSCP, OSCP with stapling, OSCP with trusted responder, and the like.

In some embodiments, OCSP can be used to verify certificates. OCSP requires a request per certificate to the certificate authorities. OCSP responds with the validity information of a certificate. The client 102 and server 104 determining if the PKI tree is sufficiently strong to establish trust.

In some embodiments, OCSP with stapling may be used for certificate verification. OSCP with stapling uses a request per certificate in the chain to the CAs. The client 102 and server 104 determine if the PKI tree is sufficiently strong to establish trust. The server 104 may also choose any OCSP responder to resolve the certificate validity.

In some embodiments, OSCP with trusted responder may be used for certificate verification. The server 104 delegates the trust tree verification. The PKI trust tree is walked to verify the end-to-end certificate path. Policies are also applied to determine if a path is trusted. OCSP with trusted responder removes the requirement of the client 102 to maintain a massive certificate store in memory. OSCP with trusted responder alleviates the client 102 from having to load keys every two days.

In some embodiments, the system 100 may include one or more trusted responders 302 and a certificate authority key repository 304. The trusted responders 302 maintain authentication between the client 102 and the trusted responders 302. The trusted responders 302 performs a PKI tree determination. The trusted responders 302 determines the level of trust between the client 102 and server 104 The trusted responders 302 sends only the necessary information for cryptographic exchange to the communicating counter parties. The client 102 may be pre-configured to trust the trusted responders 302.

During the handshake, the client 102 transmits the identity of the trusted responders 302 to the server 104. The server 104 uses the trusted responders 302 to prove the validity of the server certificate 132. The trusted responders 302 walk the Public Key Infrastructure tree to determine the level of trust between the client 102 and server 104. The server 104 receives the level of trust from the trusted responders 302. The server 104 responds to the client 102 with the server certificate 132, and the validation response from the OCSP trusted responder if any.

If the trusted responder denies the certificate, then the server 104 on the end of the D/TLS connection aborts the connection with the client 102.

The system 100 does not need to symmetrically exchange compressed identity certificates bi-directionally to establish a D/TLS login. The system 100 has the capability to exchange hashed client certificates independent of server certificates. The system 100 allows for certificate verification using powerful stationary servers with the signed results sent to the vehicle. The system 100 is compatible with existing D/TLS implementations.

Short lived certificates are starting to become normalized, which renders traditional certificate exchanges obsolete. Allowing for certificate verification using powerful stationary servers with signed results sent to constrained computers will reduce the verification time by 30-50%. The proposed solution also works inside all existing frameworks of D/TLS and will interoperate with systems that do not implement this invention. It also implements a way to use OCSP stapling and OCSP trusted responder when using compressed or hashed certificates.

Referring generally again to FIGS. 1A-3. Several examples are now provided. These examples are non-normative but demonstrate the advantage of the compression advantage of the system. The examples are provided assuming the client 102 and server 104 have ECDSA certificates of 2 Kbytes each (e.g., 2048 Bytes; 16,384 bits), one of the smallest certificate creation methods. Further assume the network 106 has a transmission frame size of 156 bits as in cellular networks. Further assume the hashing function is a set of information hashed by SHA-256.

In a first example, the server 104 and client 102 exchange certificates using traditional TLS 1.3 exchanges RFC 8846 Exchange. The server 104 sends 16,384 bits using 106 frames. The client 102 sends 16,384 bits using 106 frames. A total of 32,768 bits and 212 frames are transmitted to exchange the certificates.

In a second example, the server 104 and client 102 use compression RFC 8879. The certificates use seemingly randomized numbers to represent the identity of the end-point. While the certificates can be compressed, the ratio is likely to be on the lower end of a compression algorithm's abilities. Additionally, OCSP with trusted responder is not be possible in the RFC 8879 example. Zlib, Brotli, and Zstd are considered as instances for the compression algorithm.

In a first instance of the second example, Zlib is the compression algorithm. Zlib has between a 2:1 to 5:1 compression ratio. A 2:1 compression ratio is assumed. Zlib compresses the 16,384 bits per certificate to 8192 bits per certificate. The server 104 sends 8192 bits using 53 frames. The client 102 sends 8192 bits using 53 frames. A total of 16384 bits and 106 total frames are transmitted to exchange the certificates.

In a second instance of the second example, Brotli is the compression algorithm. Brotli has between a 2:1 to 4.5:1 compression ratio. A 2:1 compression ratio is assumed such that the first instance and the second instance requires transmitting the same number of bits and frames to exchange the certificates.

In a third instance of the second example, Zstd is the compression algorithm. Zstd has between a 3:1 to 4:1 compression ratio. A 3:1 compression ratio is assumed. Zstd compresses the 16,384 bits per certificate to 5462 bits per certificate. The server 104 sends 5462 bits using 35 frames. The client 102 sends 5462 bits using 35 frames. A total of 10924 bits and 70 frames are transmitted to exchange the certificates.

In a third example, the client 102 uses hashing and the server 104 uses compression. The client certificate is 2 KBytes Client Cert which is reduced to 2048 bits using a hash function. The server certificate is 2 KBytes which is compressed using Zstd compression with a 2:1 compression ratio to 5462 bits. A total of 7510 bits over 49 frames are transmitted to exchange the certificates. The 7510 bits achieved in the third example provides a 77% compression ratio, as compared to the total of 32768 bits in the first example. The third example also allows for OCSP with trusted responder.

In a fourth example, the client 102 and server 104 each use hashing. The client certificate and server certificate are each reduced from 2 Kbytes to 2048 bits using a hash function. A total of 2048 bits over 27 frames are transmitted to exchange the certificates. The 2048 bits achieved in the fourth example provides an 88% compression ratio, as compared to the total of 32768 bits in the first example. The fourth example also allows for OCSP with trusted responder.

In a fifth example, OCSP with trusted Responder is compared with OCSP using Traditional Exchange. The offloading of certificate validation is incalculable as the time required to process a full path validation depends on processor speed and on the RF link, the depth of the PKI tree and the path between the two certificates. It is contemplated that a 30% improvement over client verification should be expected for traditional OCSP Stapling. OCSP trusted responder should experience even faster results.

Although much of the present disclosure is described in the context of the server 104 being a ground station with a short-lived certificate and the client 102 being a vehicle with a long-lived certificate, this is not intended as a limitation of the present disclosure. In some embodiments, the server 104 is the vehicle with the long-lived certificate and the client 102 is the ground station with the short-lived certificate. If the ground station is the client 102 initiating the handshake, then the server hello message may include the client certificate hash 131, server certificate hash 133, certificate request hash 135, server certificate compression algorithm representative value 137, and/or client certificate compression algorithm representative value 139. In some embodiments, the server 104 is a moving constrained computer such as a vehicle and the client 102 is a stationary computer. The moving constrained computer may act as the server 104 and reverse the OCSP stapling roles. The client 102 may be a non-constrained computer. Most of the certificate verification work may be performed by the non-constrained computer.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A method of performing a handshake, the method comprising:
   transmitting, from a client to a server, a client hello; wherein the client hello comprises a client certificate hash, a server certificate hash, and a certificate request hash; and
   receiving, from the server by the client, a server hello in response to transmitting the client hello, wherein the server is configured to transmit a client certificate request in the server hello in response to determining the client certificate hash in the client hello does not match a hash of a client certificate maintained by the server and the certificate request hash in the client hello does not match a hash of the client certificate request maintained by the server.

2. The method of claim 1, wherein the method is a handshake protocol for initiating at least one of a transport layer security session or a datagram transport layer security session.

3. The method of claim 1, wherein the client certificate hash, the server certificate hash, and the certificate request hash are transmitted using an extension status request.

4. The method of claim 3, wherein the method is backwards compatible with a datagram transport layer security version 1.3 handshake.

5. The method of claim 1, wherein the client certificate hash, the server certificate hash, and the certificate request hash are transmitted using a certificate status type enumeration.

6. The method of claim 1, wherein the client hello comprises a server certificate compression algorithm representative value and a client certificate compression algorithm representative value; wherein the server certificate compression algorithm representative value is a representative value of a server certificate compression algorithm; wherein the client certificate compression algorithm representative value is a representative value of a client certificate compression algorithm.

7. The method of claim 6, wherein the server certificate compression algorithm and the client certificate compression algorithm are a same algorithm.

8. The method of claim 6, wherein at least one of the server certificate compression algorithm or the client certificate compression algorithm comprises zlib, brotli, or zstd.

9. The method of claim 1, wherein the server hello comprises a client certificate confirmation.

10. The method of claim 1, wherein the server hello comprises a server certificate confirmation.

11. The method of claim 1, wherein the server hello comprises a server certificate.

12. The method of claim 1, wherein the client hello comprises a server certificate compression algorithm representative value; wherein the server certificate compression algorithm representative value is a representative value of a server certificate compression algorithm; wherein the server hello comprises a compressed server certificate; wherein the server compresses a server certificate to the compressed server certificate using the server certificate compression algorithm.

13. The method of claim 12, wherein the server hello comprises one or more Online Certificate Status Protocol extensions.

14. The method of claim 1, wherein the server hello comprises the client certificate request; the method further comprising transmitting, from the client to the server, a client certificate response in response to receiving the server hello.

15. The method of claim 14, wherein the client certificate response comprises the client certificate.

16. The method of claim 14, wherein the client hello comprises a client certificate compression algorithm representative value; wherein the client certificate compression algorithm representative value is a representative value of a client certificate compression algorithm; wherein the client certificate response comprises a compressed client certificate; wherein the client compresses a client certificate to the compressed client certificate using the client certificate compression algorithm.

17. The method of claim 1, further comprising:

receiving, from the server by the client, a hello retry request in response to transmitting the client hello; wherein the hello retry request comprises a cookie; and transmitting, from the client to the server, the client hello and the cookie in response to receiving the hello retry request;

wherein the server hello is received in response to transmitting the client hello and the cookie.

18. A client comprising:
a memory maintaining program instructions; and
one or more processors configured to execute the program instructions causing the one or more processors to perform a handshake with a server, the handshake comprising:

transmitting, from the client to the server, a client hello; wherein the client hello comprises a client certificate hash, a server certificate hash, and a certificate request hash; and receiving, from the server by the client, a server hello in response to transmitting the client hello, wherein the server is configured to transmit a client certificate request in the server hello in response to determining the client certificate hash in the client hello does not match a hash of a client certificate maintained by the server and the certificate request hash in the client hello does not match a hash of the client certificate request maintained by the server.

19. A system comprising:
a server; and
a client comprising:

a memory maintaining program instructions; and one or more processors configured to execute the program instructions causing the one or more processors to perform a handshake with the server, the handshake:

transmitting, from the client to the server, a client hello; wherein the client hello comprises a client certificate hash, a server certificate hash, and a certificate request hash; and receiving, from the server by the client, a server hello in response to transmitting the client hello, wherein the server is configured to transmit a client certificate request in the server hello in response to determining the client certificate hash in the client hello does not match a hash of a client certificate maintained by the server and the certificate request hash in the client hello does not match a hash of the client certificate request maintained by the server.

* * * * *